(12) United States Patent
Stauffer

(10) Patent No.: US 7,608,361 B2
(45) Date of Patent: Oct. 27, 2009

(54) ALKALI METAL BATTERY

(76) Inventor: John E. Stauffer, 6 Pecksland Rd., Greenwich, CT (US) 06830

( * ) Notice: Subject to any disclaimer, the term of this patent is extended or adjusted under 35 U.S.C. 154(b) by 107 days.

(21) Appl. No.: 11/842,980

(22) Filed: Aug. 22, 2007

(65) Prior Publication Data

US 2009/0053596 A1  Feb. 26, 2009

(51) Int. Cl.
  *H01M 4/56* (2006.01)
  *H01M 4/58* (2006.01)
  *H01M 4/62* (2006.01)
  *H01M 4/88* (2006.01)

(52) U.S. Cl. ............... 429/225; 429/218.1; 429/231.95; 429/232; 252/182.1

(58) Field of Classification Search .................. None
  See application file for complete search history.

(56) References Cited

U.S. PATENT DOCUMENTS 3,170,816 A * 2/1965 Voss et al. .................... 429/59
3,462,304 A * 8/1969 Scholzel ...................... 429/101
3,959,012 A   5/1976 Liang et al.
3,966,493 A   6/1976 Jung
5,436,110 A * 7/1995 Coppens et al. ............. 430/204
5,641,388 A   6/1997 Kim et al.

OTHER PUBLICATIONS

International Application No. PCT/US2008/073990Written Opinion of the International Searching Authority and International Search Report mailed Jan. 31, 2009.

\* cited by examiner

*Primary Examiner*—Dah-Wei D Yuan
*Assistant Examiner*—Kwang Han
(74) *Attorney, Agent, or Firm*—Young Basile

(57) ABSTRACT

A storage battery is provided comprising appositive electrode of lead, a negative electrode of mercury, and an electrolyte consisting of an aqueous solution of a salt of an alkali metal. Upon charging the battery, lead is converted to lead dioxide and the alkali metal forms the amalgam with the mercury. During discharge, the lead dioxide is reduced to the plumbous state and the alkali metal is oxidized to the positive ion and goes into solution. The mercury is immobilized in one of several alternative ways.

10 Claims, 2 Drawing Sheets

ALKALI METAL BATTERY

CROSS-REFERENCES TO RELATED APPLICATIONS

This application is related to U.S. patent application Ser. No. 11/167,535 filed Jun. 27, 2005; which is a continuation-in-part of U.S. patent application Ser. No. 10/756,015 filed Jan. 13, 2004.

FIELD OF THE INVENTION

The present invention relates to a novel type of storage battery that is distinguished by its unique electrochemistry. The positive electrode of the battery is fabricated from a lead-based material; i.e., lead dioxide and lead monoxide or a plumbous salt. The negative electrode consists of mercury. The electrolyte for the battery is an aqueous solution of a salt of an alkali metal, including lithium, sodium, potassium, rubidium and cesium. Upon charging the battery, the lead-based material is converted to lead dioxide, and an amalgam is formed from the mercury and the alkali metal. When the battery is discharged, lead dioxide is reduced to the plumbous form, and alkali metal in the amalgam is oxidized to form a positive ion, which goes into solution.

BACKGROUND

The most common storage battery, found in almost every automotive vehicle, is the lead-acid battery. This battery comprises a lead dioxide positive electrode, a lead metal negative electrode, and sulfuric acid for the electrolyte.

A number of alternatives to the lead-acid battery have been developed over the years for use in other applications. Two of these alternative batteries employ zinc as the negative electrode and caustic potash as the electrolyte. The positive electrode of one battery is nickel oxide, and the other uses silver oxide.

In an effort to combine the best features of the lead-acid battery and the common alkaline batteries, a lead-alkaline battery was developed. Described in the above-identified co-pending patent application, this battery has a positive electrode of lead, a negative electrode from such proven materials as zinc, cadmium, lead and iron, and an alkaline electrolyte.

It is an object of the present invention to provide a still further improved storage battery. These and other objects, features, and advantages of the invention will be recognized from the following description.

SUMMARY OF THE INVENTION

The invention is a rechargeable battery in which the positive electrode comprises lead-based material, the negative electrode mercury, and the electrolyte an aqueous solution of a salt of an alkali metal. Upon charging the battery, the lead-based material is converted to lead dioxide and an amalgam is formed the mercury and the alkali metal. When the battery is discharged, lead dioxide is reduced to lead monoxide or a lead (II) salt, and the alkali metal from the amalgam is oxidized to form a positive ion that goes into solution.

The alkali metal may be chosen from the group consisting of lithium, sodium, potassium, rubidium, or cesium. Salts of these metals include sulfates, carbonates, bicarbonates, phosphates, silicates and borates. These salts may be used individually or in combination.

In order to maintain the stability of the liquid mercury, especially in mobile applications, any of several means can be employed. For example a semipermeable membrane may be used to restrict the movement of the mercury. Such a membrane is pervious to the electrolyte but confines the mercury to its compartment. As alternative, the mercury can be coated, plated, adsorbed or otherwise applied to a solid substrate that is electrically conductive. Another alternative is to gimbal the battery to resist acceleration in all or some directions.

WRITTEN DESCRIPTION

The electrochemistry of the alkali metal battery of the present invention can be illustrated by the case where a sodium sulfate solution is used for the electrolyte. Upon discharge, the following reactions are predicted:

At the positive electrode:

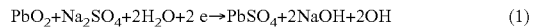

$$PbO_2 + Na_2SO_4 + 2H_2O + 2\,e \rightarrow PbSO_4 + 2NaOH + 2OH \quad (1)$$

and at the negative electrode:

$$2Na(Hg) \rightarrow 2Na^+ + Hg + 2\,e \quad (2)$$

During recharging of the cell, the above reactions are reversed.

Any alkali metal can be used in the battery of the present invention. Thus, instead of sodium shown by the above-equations, lithium, potassium, rubidium or cesium might be used. Although the reactions are similar for all of the alkali metals, they are not identical in performance. The single electrode potential for the negative electrode has been found, to depend on the particular alkali metal employed.

The alkali metals differ from each other in another respect; i.e., the solubilities of their salts are different. For example, the solubility of cesium sulfate in water at 0° C. is 167 gm. Per 100 parts of water. This value compares with 7.25 gm. per 100 parts of water for potassium sulfate at the same temperature.

Solubilities of the salts considered for use in the electrolyte also depend on the specific anion. To illustrate, lithium sulfate has a solubility of 35.34 gm. Per 100 parts of water at 0° C. whereas lithium silicate is insoluble. Lithium in particular is quite restricted by the number of available slats that are suitable.

Besides sulfates, the battery of the present invention can use a number of other salts, including carbonates; bicarbonates, phosphates, silicates and borates. These salts can be used singly or as additives to achieve desired results.

When salts other than sulfates are used, the electrochemistry differs from that shown by equation 1. Because these salts tend to be alkaline in solution, a person skilled in electrochemistry will understand that lead dioxide is reduced to lead oxide when the battery is discharged. This result affects the single electrode potential for the positive electrode.

Figure 1:
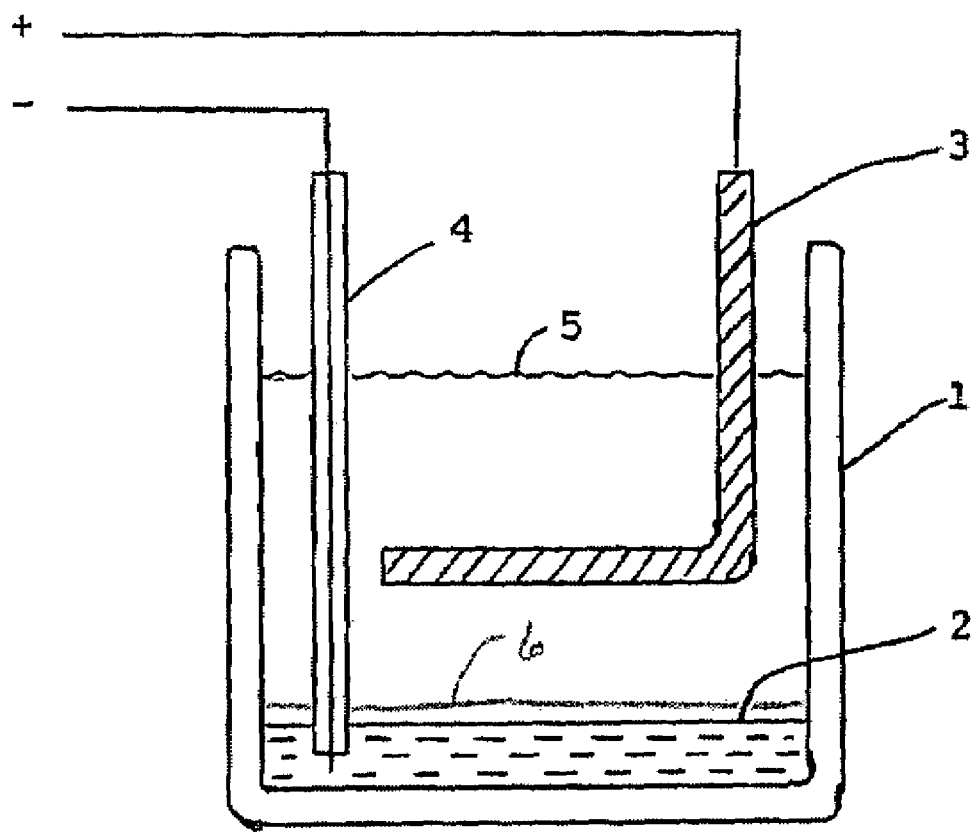
FIG. 1 is a schematic diagram of a prototype of a battery incorporating the key features of the present invention.

A working battery of the present invention is shown in FIG. 1. The cell casing 1 holds a pool of mercury 2 that covers the bottom of the container. This mercury serves as the negative electrode. The positive electrode is fabricated from a sheet of lead 3. The electrical lead to the pool of mercury runs through a glass tube 4 to insulate it from the electrolyte. Both electrodes, namely, the pool of mercury and the lead sheet are immersed in the aqueous electrolyte 5. A semipermeable membrane 6 holds the mercury 2 in place.

Figure 2:
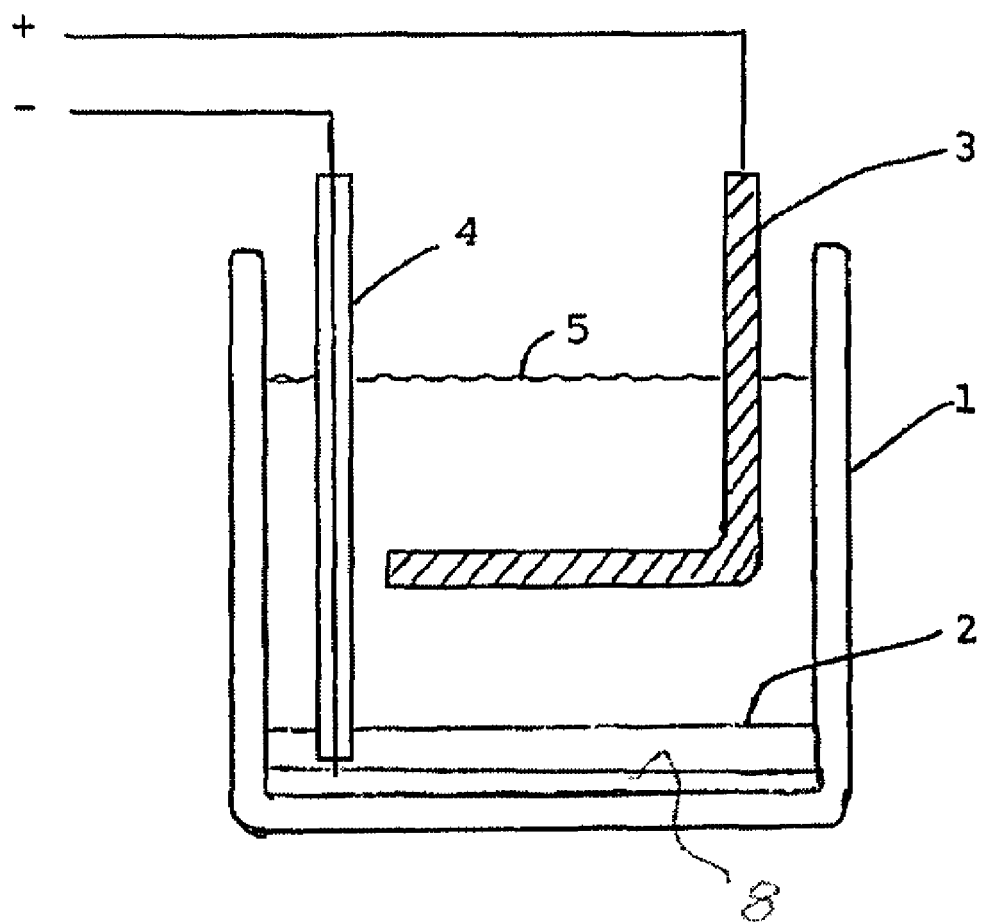
FIG. 2 is a schematic diagram of an alternative embodiment.

FIG. 2 shows an alternative embodiment of the invention in which the mercury 2 is bonded to a graphite substrate 8 to immobilize it. All of the other components are identical to those of FIG. 1 and are similarly numbered.

EXAMPLES

An experimental cell was made from a glass jar 2½ in. diameter by 2 in. high. The positive electrode was a 2½ in. diameter disk of lead. The negative electrode was a pool of mercury that covered the bottom of the jar. The negative electrical lead was connected to the mercury by means of a copper wire inside a glass tube. The electrolyte was prepared by dissolving 26.0 gm. sodium sulfate in 100 ml. water.

After charging the cell at 3.7 v. for three minutes, an open circuit potential of 3.38 v. was obtained. The cell was repeatedly charged and discharged with reproducible results. At the end of the run, the electrodes, were in excellent condition and the electrolyte was water—white.

The experiment described above was repeated using other alkali metals instead of sodium. The results are as follows. A cell with an electrolyte comprising lithium sulfate produced an open circuit potential of 3.33 v. after charging it for three minutes at 3.5 v. With a solution of potassium sulfate as the electrolyte, a cell achieved an open circuit potential of 3.45 v. after charging it for seven minutes at 3.7 v. Finally, an open circuit potential of 3.50 v. was obtained from a cell using cesium sulfate in the electrolyte after charging it at 3.9 v. for 22 minutes.

What is claimed is:

1. A storage battery comprising:
   a casing:
   a positive electrode of lead-based material;
   a negative electrode of mercury; and
   an electrolyte consisting of an aqueous solution of a salt of an alkali metal wherein the salt is selected from the group consisting of sulfates, carbonates, phosphates, silicates and borates;
   and further wherein, upon charging, the lead-based material is converted to lead dioxide and an amalgam is formed from the mercury and the alkali metal, and, upon discharging, the lead dioxide is reduced and the alkali metal from the amalgam is oxidized to form a positive ion which goes into solution.

2. A storage battery of claim 1 in which the alkali metal is lithium.

3. A storage battery of claim 1 in which the alkali metal is sodium.

4. A storage battery of claim 1 in which the alkali metal is potassium.

5. A storage battery of claim 1 in which the alkali metal is rubidium.

6. A storage battery of claim 1 in which the alkali metal is cesium.

7. A storage battery of claim 1 in which means are provided for immobilizing the mercury.

8. A storage battery of claim 7 in which the immobilizing means includes a solid substrate to which the mercury is bonded.

9. A storage battery of claim 8 in which the solid substrate is graphite.

10. A storage battery of claim 7 in which the mercury is pooled at the bottom of the casing and the immobilizing means is a semi permeable membrane between the mercury and the electrolyte.

* * * * *